Inventor
Henry L. Myers

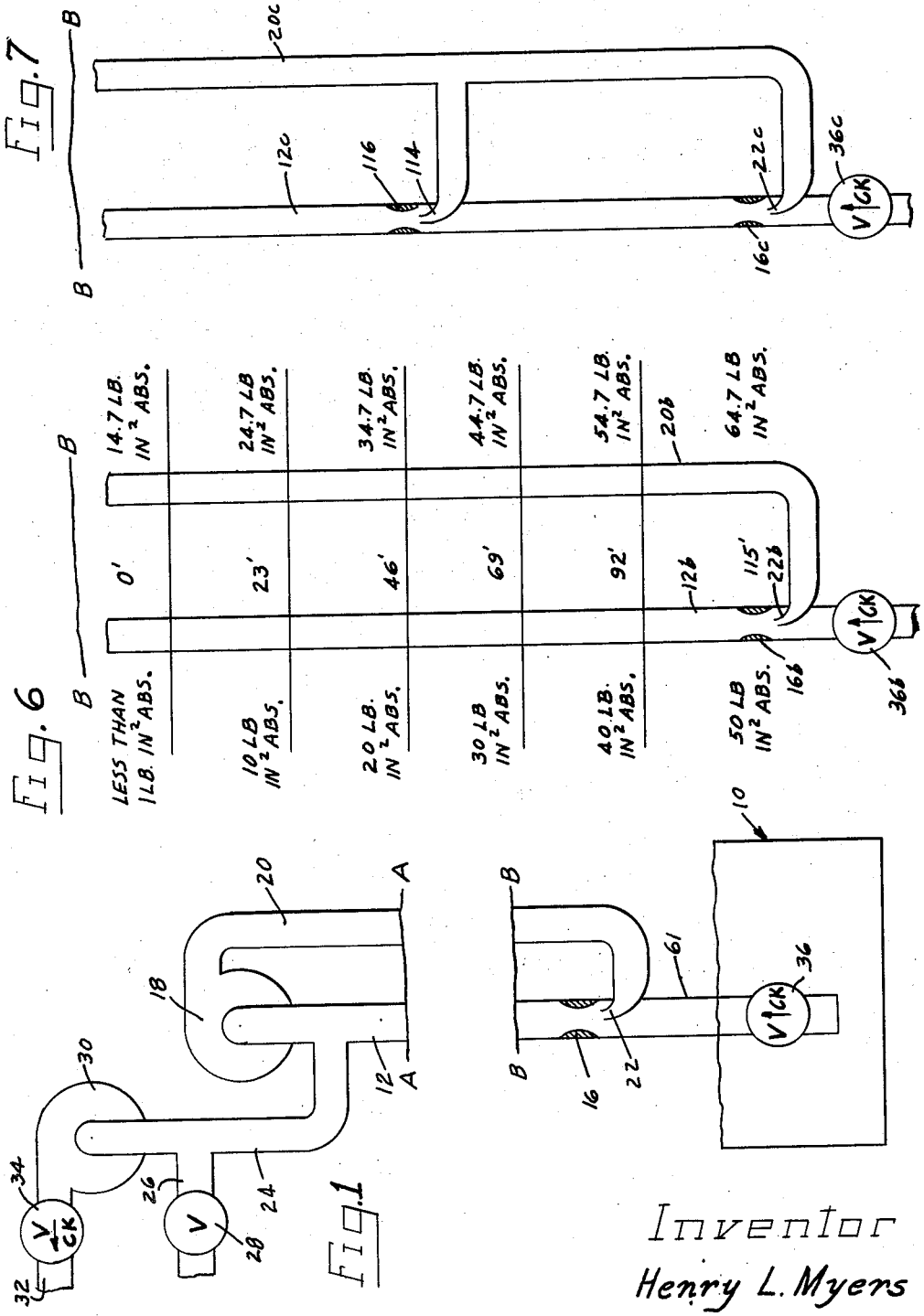
Sept. 22, 1964   H. L. MYERS   3,149,571
DEEP WELL LIQUID REMOVAL SYSTEM
Filed Dec. 11, 1959   5 Sheets-Sheet 1
Inventor
Henry L. Myers

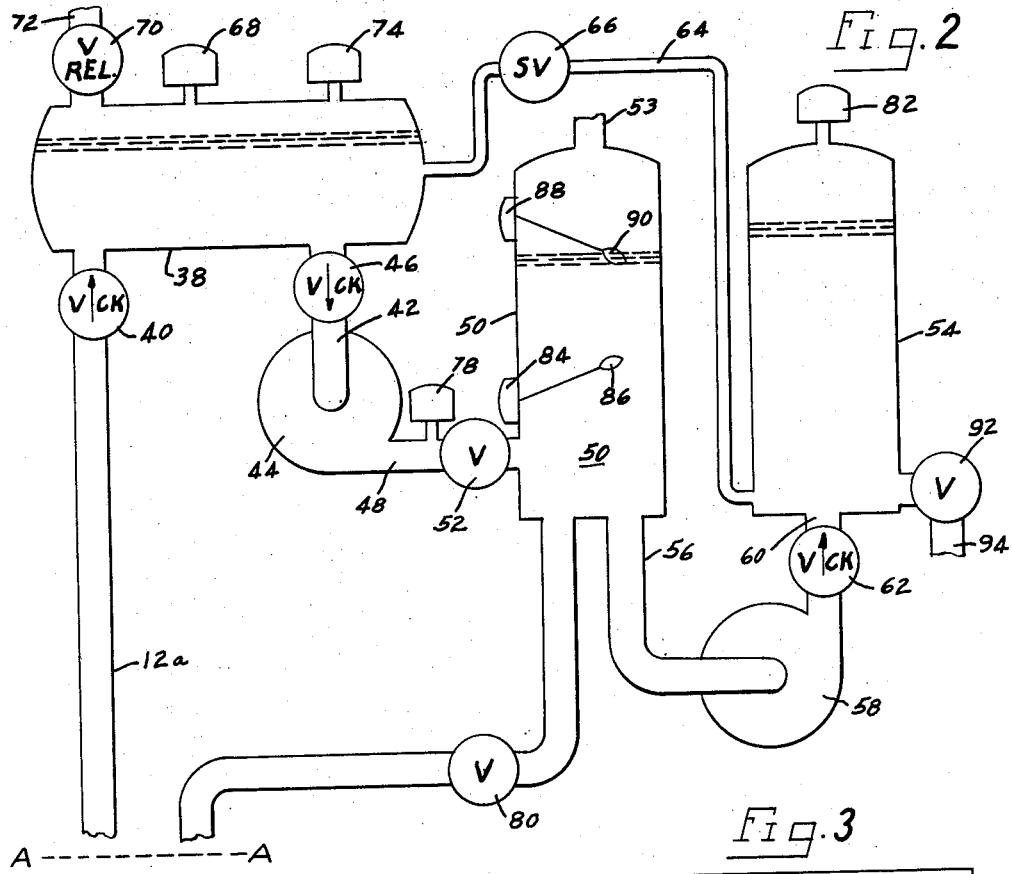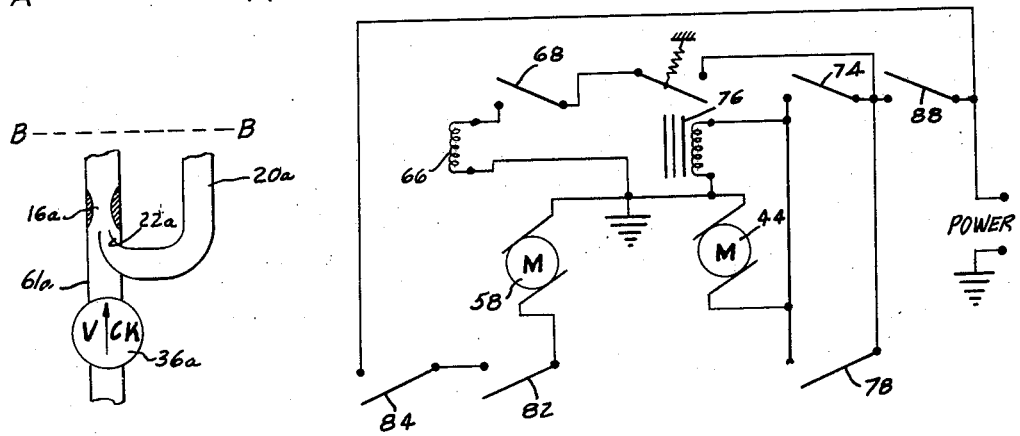

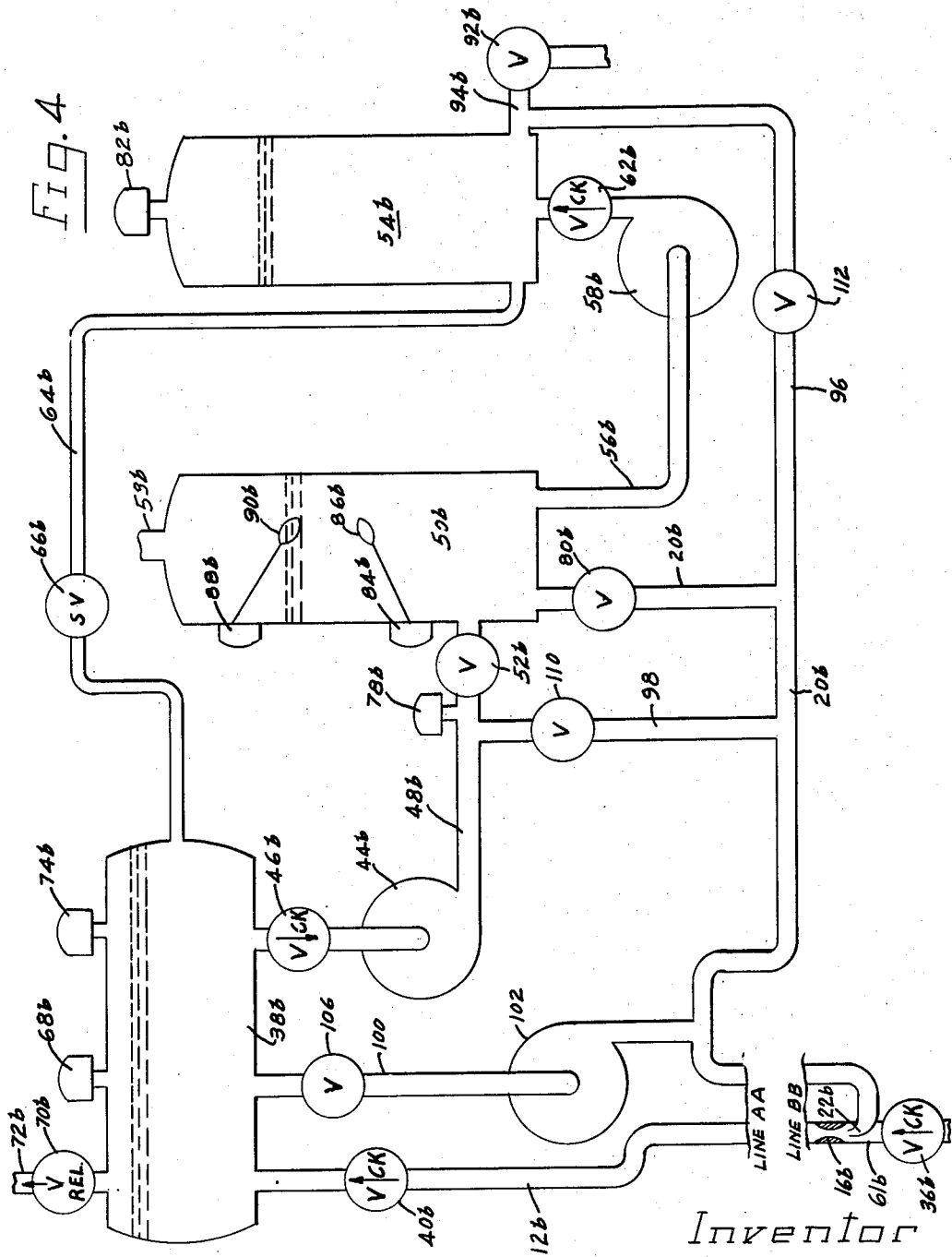

Sept. 22, 1964    H. L. MYERS    3,149,571
DEEP WELL LIQUID REMOVAL SYSTEM
Filed Dec. 11, 1959    5 Sheets-Sheet 5

Inventor
Henry L. Myers

United States Patent Office 3,149,571
Patented Sept. 22, 1964

3,149,571
DEEP WELL LIQUID REMOVAL SYSTEM
Henry L. Myers, Albany, N.Y.; Victoria Nichols, executrix of said Henry L. Myers, deceased, assignor to Victoria Nichols
Filed Dec. 11, 1959, Ser. No. 859,045
13 Claims. (Cl. 103—5)

This invention relates to a deep well and shallow well liquid removal system and more particularly to a system utilizing the energy accumulation means of my copending application Serial No. 725,124, filed March 31, 1958, of which the present application is a continuation-in-part, in conjunction with venturi means permitting deep well operation.

Heretofore, venturi means for pumping from deep well operations or the like have been well known, but these have generally been limited in their effect by the liquid pressures to be overcome in the conduit pipe leading from the well.

The present invention utilizes the principles referred to in my said copending application Serial No. 725,124 to reduce the pressures to be overcome by an available energy which is accumulated in a tank to which the fluid from the deep well is drawn.

Accordingly, it is an object of the present invention to provide a deep well system which is substantially more effective than currently available systems.

Another object of the invention is to provide a device as described which can be used as a deep well or shallow well system selectively.

Other objects and advantages of the invention will become apparent as the description proceeds in accordance with the drawings in which:

FIGURE 1 is a schematic view of a deep well and shallow well liquid removal system according to the present invention, partly broken away;

FIGURE 2 is a schematic view of a system corresponding in general operation to the device shown in FIGURE 1 and to my copending application Serial No. 725,124;

FIGURE 3 is a diagrammatic showing of a circuit for use in the system of FIGURE 2;

FIGURE 4 is a schematic showing of another embodiment of the invention;

FIGURE 6 is an enlarged schematic fragmentary view of conduit means shown in FIGURE 4 in association with relative pressure level representations;

FIGURE 7 is a view somewhat similar to the view of FIGURE 6 but representing a schematic showing of an embodiment of the invention wherein multiple venturis are utilized.

Figure 8:
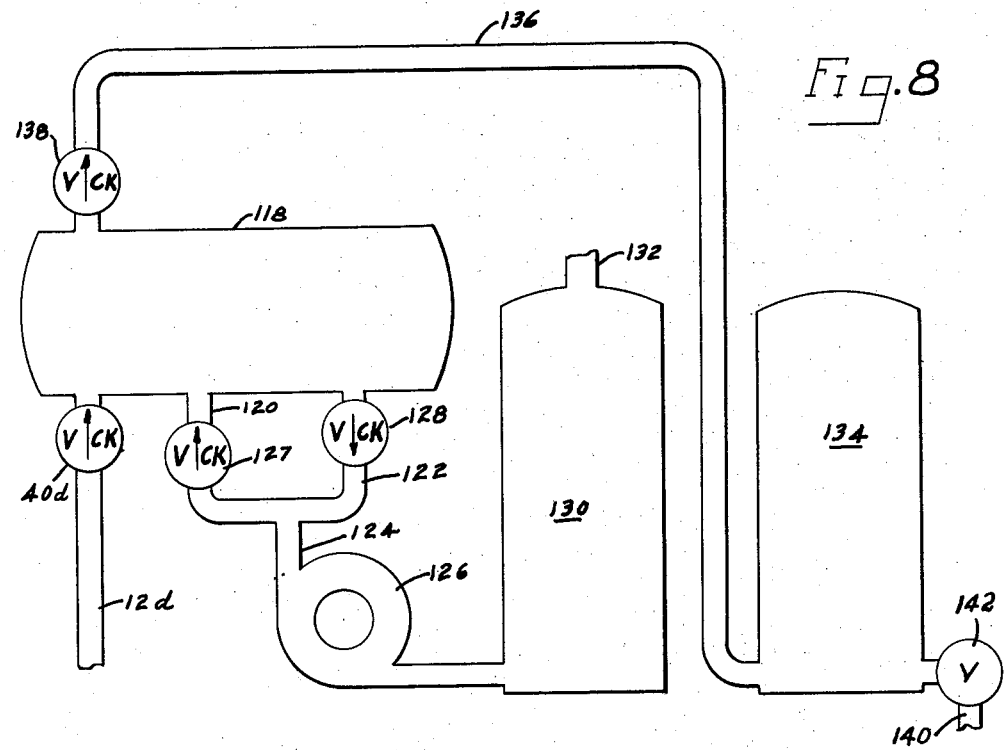
FIGURE 8 is a schematic showing of another embodiment of the system of the present invention.

Referring now to the drawing and more particularly to FIGURE 1, an embodiment of the present invention is shown for removing liquid from a well 10, comprising conduits 12 and 61 extending from beneath the water level of the well 10 upwardly to the surface indicated by level A—A and thereabove, a venturi 16 in a conduit 12 communicating with a pump 18 and extending downwardly below the level A—A a distance which generally may be greater than 33 feet, although it may be less within the scope of the invention. Lines A—A and B—B designate the broken-away portions of the system. The conduit 20 extends at its terminal lower end into the conduit 12 to provide a nozzle configuration 22 for introducing pressurized liquid into the venturi 16.

In accordance with the present invention, a conduit 24 leads from the conduit 12 to a lateral conduit 26 controllable by a valve 28. The conduit 24 also communicates at its upper end with a pump 30 for moving liquid to a conduit 32 controllable by a valve 34 which may be in communication with a pressure tank or reservoir (not shown).

In operation, with the valve 34 closed, energizing the pump 18 serves to create a pressure in the conduit 20 which effects a suction condition in the throat of the venturi 16. Thereby liquid from the well 10 is drawn upwardly, as for example through a valve 36 and passes from the conduit 61 through conduits 12 and 24 and lateral conduit 26. The conduit 26 may in turn, if desired, lead to the inlet pipe of an energy accumulation system such as described in my copending application Serial No. 725,-124. Thus the conduit 24 is in communication with the low pressure side of the liquid circuit, whereas in conventional jet pump operations, the outlet conduit would be connected to the high pressure side, i.e., to conduit 20 and would then be introduced to a pressure tank designed to store liquid under pressure in readiness for use in a home, etc.

With valve 28 closed and pump 18 energized, pressure is built up in the conduit 20 and an absence of pressure, or a vacuum, is developed in the conduit 12. Energization of the pump 30 thereupon serves to lift liquid in the conduit 24 thereby further reducing the pressure in the conduit 12. It will be seen that this action materially assists the pump 18 and effectively adds to the efficiency of the system. Likewise, and by the same token, the action of the venturi jet 16 is rendered more effective so that it can raise liquid with greater efficiency than would otherwise be possible. The liquid thus elevated is passed through the conduit 32, the valve 34 being preferably a valve responsive to the pressure of the liquid from the pump 30.

While the conduit 32 could be placed in communication with a pressure tank for storing the liquid under pressure, it is also possible to lead the fluid therefrom to a reservoir (not shown) whereby to store the liquid at atmospheric pressure for use by gravity flow means or the like, or in the event that the point of use is at an elevation higher than the reservoir, by pump means (not shown).

Deenergization of the pump 30 and opening of the valve 28 to a conduit such as referred to previously for introducing liquid to an energy accumulation tank (numerals 42 and 32 respectively in FIGURE 3 of the aforementioned copending application 725,124) permit the energy accumulated as described in the said copending application to be utilized in assisting the pump 18 and the venturi jet 16 in elevating liquid with greater efficiency than previously has been possible.

Referring now to FIGURES 2 and 3, a liquid removal system suitable for deep or shallow wells is shown in accordance with the invention, which utilizes the principles of the accumulator previously referred to. In this embodiment, conduits 12a and 61a leads to a well (not shown) in the manner described with respect to the conduits 12 and 61 in FIGURE 1. The conduit 12a is provided with a venturi 16a which may have a valve 36a residing in the conduit 61a therebelow. A conduit 20a introduces pressure through a jet 22a to the venturi 16a, but the relative pressures in the system are effected by accumulator means including a tank 38 communicating with the conduit 12a controlled by a valve 40, a conduit 42 at the bottom of the tank 38 controlled by a valve 46 leading to a pump 44 and a conduit 48 leading to a tank 50 as controlled by a valve 52. Liquid from tank 38 is drawn through valve 46 by the pump 44 and introduced into the tank 50, which in turn communicates with the conduit 20a controlled by a valve 80 for operating the jet comprising the venturi 16a and a nozzle 22a. Tank 50 may be open to atmosphere at its upper end as indicated at 53 and liquid may be introduced to a pressure tank 54 via a conduit 56 leading to a pump 58 and a conduit 60 which may enter the bottom of the tank 54 as controlled by a valve 62. Accordingly, the atmospheric pressure on the liquid in the tank 50 affords a pressure differential relative to the pressure in the tank 38 to the extent that the pump 44 has removed liquid from the tank 38 with the tank 38 sealed from atmosphere, as hereinafter set forth.

Thus, a reduced pressure or vacuum will be afforded with respect to the column of water in conduit 12a and to that extent the pressure in accordance with atmospheric pressure in the tank 50 will be effective to move the liquid downwardly in the conduit and 20a and through the venturi nozzle 22a and thence upwardly into the tank 38 through column 12a with the usual jet action wherein a reduced velocity occurs at the venturi 16a and thereafter is converted into pressure force for moving the liquid upwardly in the column 12a. The reduced pressure in the venturi is a function of the speed of the liquid passing therethrough and where liquid has been drawn from tank 38 to effect a pressure reduction, a pressure differential will exist at the venturi to draw liquid from the jet 22a, thereby creating a suction in conduit 61a, thus lifting liquid from the source of fluid supply.

In utilizing the liquid removal system of FIGURES 2 and 3, switch means are provided for controlling the flow of liquid to the pressure tank 54 to service conduit 94 via valve 92. Also, the pressure condition in the tank 54 may be selectively vented to the chamber 38 through a conduit 64 closable by a valve 66. The valve 66 opens in response to a relatively "soft" vacuum condition in the tank 38, i.e. wherein the pressure approaches atmospheric pressure, and it closes in response to a relatively "hard" vacuum in the tank 38 or by opening of relay contacts 76. Desirably, therefore, control contacts 68 for the valve 66 close to open valve 66 if the relay contacts 76 and the float switch contacts 88 are closed when the vacuum condition in the tank 38 is less than the maximum vacuum obtainable therein, at which time pressurized liquid from tank 54 enters tank 38 through conduit 64 to expel any air or gas therefrom via a valve 70 in the conduit 72. When the pressure condition in the tank 38 approaches approximately one pound per square inch above atmospheric pressure the valve 70 will open allowing any air or gas content occupying the area over the liquid in the tank 38 to be released through said valve 70 via conduit 72. However, if a liquid condition exists at the valve 70, said valve will restrict the flow of liquid until the pressure in the tank 38 approaches approximately three pounds per square inch above atmospheric pressure. At such time the valve 70 would allow liquid to flow therethrough. Switch contacts 74 are provided which close at a pressure of approximtaely two pounds per square inch, or less than the liquid pressure effective to open the valve 70. Valve 46 is biased towards closing sufficiently to allow the pressure of approximately three pounds per square inch to be attained in the tank 38. Valve 46 of course, would open in accordance with the movement of liquid produced by pump 44. It might be well to note here that valve 46 could reside in the conduit 48, as in certain operations this has been found advisable, in the steps of achieving a vacuum to a greater extent of hardness in the tank 38. It may be noted also however that the biasing of valve 46 could be eliminated if the bottom of the tank 50 were at a sufficient elevation above the top of the tank 38, to create a back pressure in excess of the pressure at which the contacts 74 are constructed to close. For example, in the instance of a pressure of 3 pounds per square inch for such contacts, the tank 50 would be elevated approximately 6.9 feet above the tank 38 to provide the necessary pressure condition, in accordance with the formula that 2.3 feet of elevation are equivalent to 1 pound of pressure.

Closing of the switch elements 74 is effective to close the valve 66, by means of a relay 76 as seen in FIGURE 3. Thereupon the tank 38 is cut off from the pressure in the tank 54 and may develop a relative vacuum condition as hereinafter set forth.

Also, by the closing of the control switch 74, the pump 44 is energized, it being again noted that the valve 46 is opened at such time.

Removal of a small amount of liquid from tank 38 by means of the pump 44 is effective to open the switch means 68 as well as the switch means 74. Although this places these switch elements in condition for a further cycling operation, it is not effective to deenergize the coil of relay 76 or the pump 44 because a switch 78 is provided immediately after the pump which responds to pressure increases and closes to maintain a parallel circuit to the coil of relay 76 and the motor of the pump 44 as shown in FIGURE 3. Thus, the pump 44 will continue to operate until the tank 38 is substantially emptied, whereupon the pressure in the conduit 48 will fall to a level such as to open the switch means 78 and shut off the pump, halting the movement of liquid in the conduit 42, thus closing valve 46. The valve 40 is provided in the conduit 12a to prevent backflow of the liquid from the tank 38 to the source of the liquid via the conduit 12a. This valve may vary in its construction and operation in accordance with the gallons per hour of liquid it is desired to raise, and other conditions as hereinafter set forth. Thus, the vacuum in the tank 38 lifts liquid into the tank, during and/or after removal of liquid from the said tank.

Assuming that the valve 40 opens upon the creation of a vacuum condition, liquid will then be drawn into the tank 38 until it is substantially filled and a relatively soft vacuum condition is afforded such as to close the switch elements 68 and again open the valve 66. Thereupon the drawing cycle will repeat itself continuously until the tank 50 is filled, thereby opening the float switch 88.

Thus, a condition prior to the pump 44 initiates the pumping operation, and a liquid pressure condition subsequent to the pump maintains the pumping operation even after the condition which initiated the pumping operation has terminated, and until such time as there is an altered condition in the pump conduit 48 adjacent the contacts 78. The valve 52 in the conduit 48 may also be closed slightly to afford additional pressure in the said conduit 48 extending the time the contacts 78 would remain closed, thus maintaining the pumping operation to the fullest extent.

Due to the previously described pressure differential existing between the tanks 38 and 50 and between the conduits 12a and 20a when the valve 80 in the conduit 20a is opened, liquid may be raised even if the venturi 22a is located below the conventional shallow well depth. However, by closing the valve 80, the system may readily be converted from a deep well to a shallow well operation.

In transmitting liquid from the tank 50 to the tank 54, switch means 82 are provided in the tank 54 which respond to a pressure which is relatively reduced in terms of the normal pressure in this tank so as to close, for example, at a pressure of 20 pounds per square inch, while opening at a relatively high pressure, i.e., approximately 40 pounds per square inch. The switch means 82 cooperates with switch means 84 in the tank 50 operable by a float 86 so that when the liquid in the tank 50 is above a predetermined level the contacts 84 close. Contacts 82 and 84 are in series, as shown in FIGURE 3, and together serve to energize the pump 58 to introduce liquid under pressure into the tank 54.

The switches 68, 74 and 78 and the contacts of relay 76 are also in series with a primary switch 88 controllable by a float 90 in the tank 50. Thus when the liquid in the tank 50 is somewhat less than full, the switch 88 is closed, but when the tank 50 is full, as a result of the hereinbefore described cycling operation, the switch 88 opens to terminate such operation.

Liquid may be removed under pressure from the tank 54 by a conventional control valve 92 and an outlet conduit 94.

Float switch means (not shown) could also be provided at the top of the tank 50 responsive to a full condition of the tank to energize the pump 58 in conjunction with a parallel circuit in communication with conduit 60 such as previously described in conduit 48 to maintain the operation of the pump 58 until the tank 50 is completely empty. Such a switch would require but a very limited travel to energize the pumping operation in response to a slight increase in the liquid level in the tank toward the full condition. For example, a float rise of one inch could be utilized. Such a structure could be actuated by a switch means and would thus afford means to completely empty any enclosure, as a result of the effective operation of a parallel circuit such as described as maintained by a pressure condition. The control system may thus be used in a wide variety of applications and flow conditions, as for example in sump pumps and other industrial situations.

Figure 5:
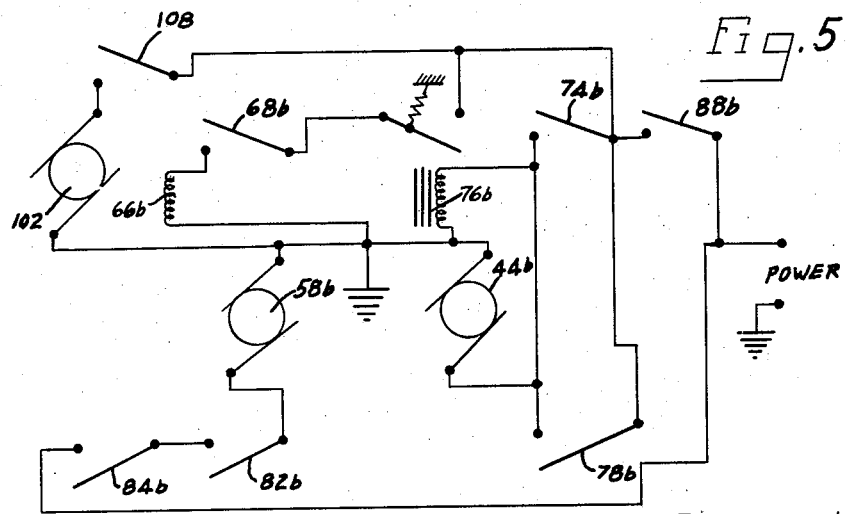
FIGURE 5 is a circuit for use in the structure of FIGURE 4.

Referring now to FIGURES 4 and 5, another embodiment of the invention is shown wherein similar reference numerals refer to similar parts. The embodiment of FIGURE 4 is essentially that of FIGURE 2, but affords novel control means as hereinafter set forth. Thus, conduit 20b extends, by means of a branch conduit 96, into communication with the outlet pipe 94b prior to the valve 92b. Also, a conduit 98 communicates at its upper end with a portion of the conduit 48b which is prior to the valve 52b and with the conduit 20b at its lower end; and a conduit 100 communicates with the bottom of the tank 38b and with the conduit 20b, with a pump 102 being provided therein whose liquid supply is controlled by a valve 106. These structures constitute means for pressurization of the nozzle 22b relative to the conduit 12b in a manner which affords greater differential than the differential between atmospheric pressure and the vacuum in the tank 38b. Also for this purpose, a switch 108 is provided which is responsive to an opened or closed condition of valves 80b, 106, 112 and 110 to maintain the pump 102 in an energized or deenergized condition as required. With valves 92b, 80b, 110 and 106 closed and a valve 112 in conduit extension 96 open, liquid from pressurized tank 54b will be introduced to the nozzle 22b. Thus, if the previously mentioned pressure of 40 pounds per square inch exists in the tank 54b and the pressure in the tank 38b corresponds to the point of vaporization of the liquid therein, a net differential pressure between the nozzle 22b and the venturi 16b is effected which is approximately 54.7 pounds per square inch, with the pressure in the tank 38b at such time being substantially 14.7 pounds below atmospheric pressure. Since this greater pressure differential creates an increased velocity through the nozzle 22b, a greater amount of liquid can be lifted from the liquid source (not shown) relative to the quantity of liquid passing through the nozzle.

If the valve 110 is then opened, with the pump 44b in operation, valve 52b partially closed, and the valves 112, 80b and 106 closed, a relatively high pressure differential and lifting power will also be available. However, with valve 110 and valves 80b, 112 and 92b closed as previously mentioned, opening of valve 106, and closing the switch 108 thereby energizing the pump 102. This condition again serves to create a pressure differential determined by the vacuum condition in the tank 38b and the pressure force developed at the outlet of the pump 102. At the same time, the removal of liquid by the pump 44b from the tank 38b maintains the vacuum condition in the tank 38b and is effective to produce a vacuum initially. However, the pump 44b may be energized to remove a substantial amount of liquid from the tank 38b, thus producing a vacuum therein. Then upon energizing pump 102, a jetting action will be afforded in the venturi 16b, effective to refill 38b.

Referring now to FIGURES 4 and 6, the conduits 12b and 20b of FIGURE 4 are shown in enlarged fragmentary schematic form in FIGURE 6, with the conduits extending for a depth of 115 feet below the surface level indicated at line A—A for purposes of illustration. With a vacuum condition in tank 38b equivalent to the point of vaporization of the liquid therein, and an atmospheric pressure condition in tank 50b, a pressure will exist in the conduits 12b and 20b such as are indicated in FIGURE 6. These pressures are designated according to the absolute pressure scale rather than the gauge pressure scale so that at zero feet, the conduit 20b would have a pressure of approximately 14.7 pounds per square inch absolute and the conduit 12b a pressure of less than 1 pound per square inch absolute. At the location of the nozzle 22b, the conduit 20b would have a pressure of 64.7 pounds per square inch absolute and the conduit 12b would have a pressure of 50 pounds per square inch absolute. Accordingly, a pressure differential of approximately 14.7 pounds is available, it being assumed that the tank 50b is at an atmospheric pressure of approximately 14.7 pounds and the tank 38b at a pressure of substantially zero, i.e., a pressure corresponding to the vaporization level of the liquid therein. Thus the jet of the invention could operate in the absence of additional force to afford a nozzle pressure of approximately 14.7 pounds per square inch and is therefore "self-acting" to that extent. Such action is available despite the fact that the nozzle 22b may be disposed many feet below the atmospheric lift afforded conventional shallow well operation.

Referring now to FIGURE 7, another embodiment of the invention is seen wherein a conduit 12c, generally corresponding to the conduit 12b of FIGURES 4 and 6, is utilized in conjunction with a conduit 20c which is also connected to structures as shown in FIGURE 4. In this embodiment of the invention a second venturi jet is disposed at a predetermined elevation above the jet structure afforded by nozzle 22c and venturi 16c, the nozzle and venturi means thereof being designated by reference numerals 114 and 116 respectively, it of course being understood that other venturis and jets could reside below venturi 16c and jet 22c. The operation of the venturi jet provided by the nozzle 114 and the venturi 116 corresponds generally to that previously described, but it will be appreciated that a substantial vacuum condition will be produced in the portion of conduit 12c between the venturi afforded by the elements 114 and 116, and the venturi afforded by the elements 22c and 16c. Furthermore, a pressure condition will be available in the nozzle 22c corresponding to the height of the conduit 20c as previously described to energize the bottom jet with the force described with respect to FIGURE 6 augmented by the vacuum in the portion of the conduit 12c between the said venturi structures. Thus, the "jet over jet" construction of the embodiment of FIGURE 7 may effect a lifting action for the bottom jet due to the vacuum created in the throat 116 at the top venturi jet. Operation of the pumps shown in FIGURE 4 to pressurize the conduit 20c in excess of the pressure afforded by the weight of the liquid and the atmosphere would, of course, further increase the pressure differentials available. Thus the lifting action of this system is more extensive than conventional jets. The multiple jet structure herein disclosed is therefore of particular utility in the structure of the system shown in FIGURE 4, as well as in that of the preceding embodiments, but it may also be utilized in conventional jet pumping operations.

Referring now to FIGURE 8, yet another embodiment of the invention is shown wherein a conduit 12d is utilized to lift liquid from a source (not shown) via a valve 40d to a tank 118, and a pair of conduits 120 and 122 lead from the tank 118 to a conduit 124 communicating with a pump 126. Valves 127 and 128 are provided in the conduit sections 120 and 122 as hereinafter further described, which open in response to pumping of liquid into the tank 118, and removal of liquid therefrom, respectively. Valve 127 is biased toward closing sufficiently to allow liquid to be lifted from the well via conduit 12d, even after the pump 126 has been deenergized in accordance with the vacuum and energy accumulated in the tank 118. The pump 126 is effective to introduce liquid to a tank 130 via conduit 124. Tank 130 may be vented to atmosphere at 132. A pressure storage tank 134 is provided which is in communication with the tank 118 via a conduit 136 having a valve 138 permitting liquid to flow from the tank 118 to the tank 134. With the tank 118 filled, operation of pump 126 in a counterclockwise direction will draw liquid through the conduit 122 and the conduit 124 into the tank 130 thereby closing valves 127 and 138 substantially emptying the tank 118 thus creating a vacuum condition in the tank. This vacuum condition is effective to draw water through the conduit 12d, as for example from a distance of substantially 33 feet below the level of the tank. It will be understood that a restricted flow construction could be afforded in the conduit 12d to limit the flow from the well in accordance with the user's demand. It might be well to note here that such restriction of flow would necessarily effect an extended vacuum in the tank 118, i.e., if the pump 126 removed liquid from the tank 118 more rapidly than the said restriction would allow liquid to be lifted from the well. Also this vacuum condition would be effected in the tank 118, if a substantial elevational lift was afforded in the conduit 12d, and also if a fine screened well point was used on the lower end of conduit 12d. These of course would be restrictions of a natural type.

Operation of the pump 126 in a clockwise direction will then serve to move liquid through the valves 127 and 138 via the conduits 124, 120 and 136 into the pressure tank 134 thereby closing valves 40d and 128. Repetition of this cycle will provide liquid in the tank 134 as desired, such as to service the outlet 140 thereof, as controlled by valve 142. Thereupon the tank 134 may be replenished by operating the pump 126 in a clockwise direction, and the cycle is repeated until a sufficient volume and fluid pressure condition is again obtained in the tank 134.

Also in accordance with the invention and the embodiment of FIGURE 8, air cushion means are provided in the tank 134 to the extent that the entrained air that was removed from the liquid, by the vacuum condition afforded in the tank 118, is pushed ahead of liquid emanating from the tank 118 through the conduit 136. Excess air or gas will, of course, be discharged from the outlet conduit 140.

Infusing two materials adapted to react chemically to produce heat, as for example, an acid and an alkali, into an enclosure such as enclosure 38b, will effect an expansion effective to expel a portion of either or both of the materials in the fluid state, so that when the enclosure is closed and cooling causes condensation, a vapor-vacuum will be achieved which will place the remaining fluid at its boiling point.

Figure 9:
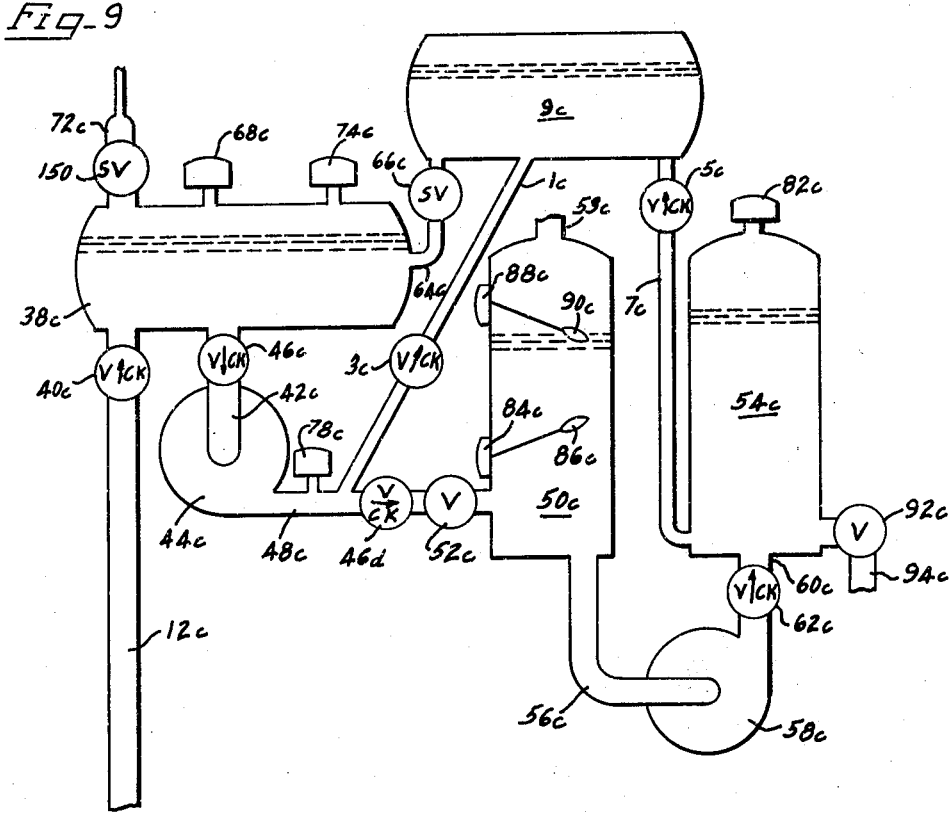
FIGURE 9 is a schematic showing of yet another embodiment of the system of the present invention.
Figure 10:
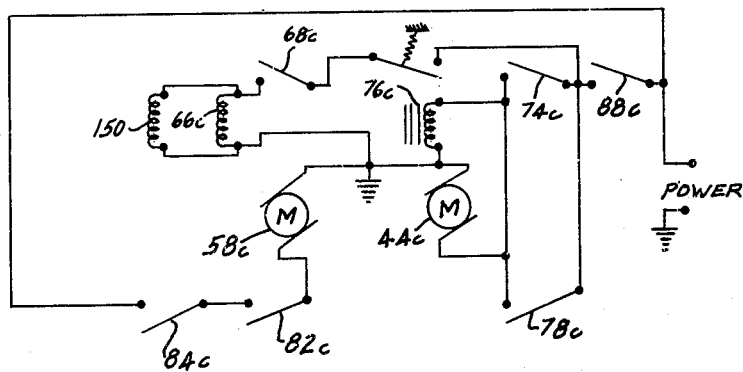
FIGURE 10 is a circuit for use in the structure of FIGURE 9.

Referring now to FIGURES 9 and 10, a liquid removal system 1s shown in accordance with the invention, which utilizes the principles of the accumulator previously referred to. In this embodiment, a conduit 12c is in communication between a tank 38c and a source of liquid supply (not shown) controlled by a valve 40c which opens in the direction of the tank 38c, an air or gas release conduit 72c communicates between the tank 38c and atmosphere controlled by a valve 150. The conduit 72c at its upper end narrows as to its cross-section to provide a partial restriction to the flow of liquid therethrough. A conduit 42c communicates with the tank 38c and the suction side of a pump 44c. The conduit 42c is controlled by a biased valve 46c opening in the direction of the pump 44c. A conduit 48c communicates from the pressure side of the pump 44c to a tank 50c controllable by a valve 52c and also by a biased valve 46d. A conduit 1c communicates from the conduit 48c prior to the biased valve 46d to a tank 9c and is controlled by a valve 3c opening in the direction of the tank 9c. The tank 9c is in communication with a tank 54c via a conduit 7c controllable by a valve 5c which opens in the direction of the tank 9c, the tank 9c is also in communication with the tank 38c via a conduit 64c controllable by a valve 66c. The tank 50c communicates with the suction side of a pump 58c via a conduit 56c and the pump 58c communicates with the tank 54c via a conduit 60c controllable by a valve 62c which opens in the direction of the tank 54c. The tank 54c has an outlet conduit or service pipe 94c controllable by a valve 92c. The tanks 54c and 9c are of a pressure type and the tank 50c is of a reservoir type vented to atmosphere at 53c, and the tank 38c is of the accumulator type as referred to previously. The pressure in the tank 54c is controlled by a pressure control switch 82c residing therein. Control switch 82c is in series circuited arrangement with a float switch 84c residing in the tank 50c. The contacts of the pressure control 82c are constructed to close at a relatively low pressure and to open at a relatively high pressure.

The tank 50c is equipped with a float switch 84c and a float 86c residing in the lower portion of said tank. The tank 50c is also equipped with a float switch 88c and a float 90c residing in the upper portion of the said tank. The contacts of float switch 84c are constructed to close when the float 86c is at its upward position of travel. These contacts are constructed to open when the float 86c is at its lowest position of travel, this lower position being slightly above the bottom of the tank 50c and the contacts of the float switch 88c are constructed to open when the float 90c is at its highest point of travel or just below the top of the tank 50c and the contacts of said float switch are constructed to close when the float 90c is at a relatively lower position in the tank 50c. The switch contacts of the control 68c are constructed to close at a relatively soft vacuum and they open at a harder vacuum than they close at. The contacts of control 74c are constructed to close at a pressure slightly above atmospheric pressure and they open at a soft vacuum. The contacts of control 78c are constructed to close at a relatively high pressure and they open at a relatively low pressure.

Valve 46c is biased towards closing sufficient to allow pressure to be built up prior to the valve, valve 46d is similar valve 46c and these two valves are shown here to illustrate that the two valves can be used simultaneously in the operation of the system, although the system may be operated equally well or in some instances more efficiently by omitting valve 46c or 46d. If valve 46c was to be omitted then the suction energy necessary to open the valve 46c could be used to more efficiently evacuate the tank 38c. In such operation the valve 46d would be opened by the positive pressure developed by the pump 44c. Thus, the pressure energy used to open the biased valve 46d would be much less in relation to the pressure energy developed by the pump 44c whereas the suction or vacuum energy necessary to open the biased valve 46c would be in relation to a greater part of the suction energy developed by the pump 44c.

Also, control contacts 68c for the valves 66c and 150 close to open the valves 66c and 150 if the relay contacts 76c and the float switch contacts 88c are closed when the vacuum condition in the tank 38c is less than the maximum vacuum obtainable in the tank 38c at which time pressurized liquid from the tank 9c enters tank 38c through conduit 64c thus expelling any air or gas via the valve 150. The end of the conduit 72c is of a relatively small size sufficient to allow air or gases to pass therethrough with relative ease, but by the reason of its restricted size it will restrict the flow of liquid. Such restriction of liquid is capable of allowing a pressure to be built up in the tank 38c sufficient to close the contacts of control switch 74c in the tank 38c. Switch contacts 74c are provided which close at a pressure of approximately 2 pounds per square inch, or less than the liquid pressure that could be achieved in the tank 38c due to the restrictive section of the portion of the conduit 72c, above the valve 150.

Assuming now tank 38c and 50c filled with liquid and conduits, valves, pumps and equipment connected therewith containing liquid, tank 54c containing sufficient pressure and liquid to de-energize pump 58c in accordance with pressure switch 82c. Tank 9c containing liquid at a pressure in direct relation to the pressure contained in tank 54c.

By opening valve 92c in outlet conduit 94c liquid will be released from tank 54c, thereby lowering the pressure in tank 54c sufficient to close contacts of control 82c, thereby energizing pump 58c through series circuited arrangements with switch contacts 84c and float 86c being at its upward position due to the filled condition of tank 50c. Energization of pump 58c will draw liquid from tank 50c via conduit 56c and pump it into pressure tank 54c via conduit 60c, thus opening valve 62c by means of movement of liquid therethrough. Switch contacts 88c at this time are in the opened position because the liquid level in tank 50c is at a relatively high level and float 90c is in its upward position.

Therefore, energization of pump 58c withdraws liquid from tank 50c lowering the liquid level in the tank 50c, lowering float 90c to a level that will close the switch contacts 88c, thereby completing the circuit through contacts of control 68c in the tank 38c, thus opening the valve 66c in the conduit 64c and the valve 150 in the conduit 72c allowing pressurized liquid to flow from the tank 9c via the conduit 64c into the tank 38c thus releasing any air or gases from the tank 38c via conduit 72c and increasing the pressure in the tank 38c to the level that the switch contacts of control 74c are constructed to close at. The closing of switch contacts 74c energizes the coil of relay 76c opening the switch contacts of the relay 76c, thus closing the valves 66c and 150 in the conduits 64c and 72c, thereby stopping the flow of liquid from the tank 9c to the tank 38c and also sealing the tank 38c from atmosphere by the closing of the valve 150. At the time that switch contacts 74c close energizing the relay coil of relay 76c the closure of switch contacts 74c also energizes pump 44c. Upon energization, pump 44c withdraws liquid from the tank 38c through conduit 42c opening biased valve 46c and/or 46d by means of movement of liquid therethrough. Also the withdrawal of liquid from tank 38c creates a vacuum sufficient to open the switch contacts of controls 68c and 74c thereby, placing them in a position for further cycling operation. Pump 44c pumps the liquid removed from tank 38c into tank 50c via conduits 46c and 48c controlled by the valve 52c and biased valves 46c and/ or 46d which are opened by the movement of liquid therethrough. It can be readily seen that the pump 44c energized thus pumping liquid to tank 50c the pressure produced in the conduit 48c in accordance with the adjustment of valve 46d or valve 52c, the pressure in excess of atmospheric pressure allows a portion of the liquid in conduit 48c to be transmitted to tank 9c, if the tank 9c communicating with the conduit 48c via the conduit 1c controlled by valve 3c has a lesser pressure than that achieved in the conduit 48c. Thus, a portion of the liquid would be propelled through the conduit 1c into the tank 9c, thereby opening valve 3c by the movement of liquid therethrough. Also the pressure created in the conduit 48c would close the contacts of the pressure control 78c.

Removing a small amount of liquid from the tank 38c creates a vacuum energy condition in said tank. Contacts of controls 68c and 74c are constructed to open upon the creation of a few inches of vacuum. The opening of contacts 74c however, will not de-energize the pump 44c or the relay coil of relay 76c as the pressure created by pump 44c in the conduit 48c is sufficient to hold the switch contacts in control 78c closed, thereby continuing the operation of pump 44c until such time as the pressure in conduit 48c drops to a level sufficient to allow control switch 78's contacts to open, thus de-energizing the pump 44c and the coil of relay 76c.

The aforementioned vacuum energy created in the tank 38c, in accordance with the removal of liquid therefrom, will raise liquid in the conduit 12c via the valve 40c, thus opening the valve 40c by movement of liquid therethrough. When the amount of liquid removed from tank 38c by the pump 44c is in excess of the liquid being raised via the conduit 12c from the source of the liquid and at which time tank 38c may be substantially emptied of liquid the pressure will diminish in the conduit 48c sufficient to allow the switch contacts of the control 78c to open, thereby de-energizing the pump 44c and the coil of relay 76c. After de-energization of the pump 44c vacuum energy will still be available in the tank 38c and liquid will continue to be raised in the conduit 12c until the tank 38c is again substantially refilled. At this time, it might be well to note that any air that was entrained in the liquid that was raised via conduit 12c to the tank 38c was removed from the liquid due to the vacuum energy that was created in the tank 38c. This air removed from the liquid will then reside in the top of the tank 38c above the liquid now contained therein.

Thus, when the vacuum energy has decreased to a relatively soft vacuum, switch contacts of control 68c are constructed so as to close at this relatively soft vacuum. The closing of the switch contacts 68c opens the valves 66c and 150 in the conduits 64c and 72c, thus allowing pressurized liquid to flow from the tank 9c into the tank 38c, and releases the air from the tank 38c, via the conduit 72c. Upon a liquid condition existing in the conduit 72c the restriction to flow of the liquid would then permit a pressure in excess of approximately 3 pounds per square inch to be built up in the tank 38c. However, switch contacts 74c are constructed to close at a pressure of approximately 2 pounds per square inch above atmospheric pressure. The closing of contacts 74c at such a pressure energizes the coil of relay 76c opening the switch contacts of the relay 76c, thereby closing the valves 66c and 150 halting the flow of pressurized liquid from the tank 9c to the tank 38c via the conduit 64c and sealing the tank 38c from atmosphere by the closing of valve 150. Such closing of the contacts 74c also energizes the pump 44c and the heretofore cycling operation is repeated until the liquid in the tank 50c is at a high enough level to raise the float 90c to its upward position, thereby opening the contacts of float switch 88c. Opening of contacts 88c will halt this cycling operation. Pump 58c may be energized even though the switch contacts 88c are open. Upon again opening the valve 92c and allowing pressurized liquid to be expelled from the tank 54c thereby lowering the pressure in the tank 54c sufficient to close the switch contacts 82c in the tank 54c, thus energizing the pump 58c. Thus, the liquid level in the tank 50c would again be lowered, thus lowering the float 90c to a position whereby switch contacts 88c would close. At such time the before described cycling operation would again be repeated.

It might be well to note here that structures similar to conduits 20a and 61a and the venturi means 16a and 22a and the valves 80 and 36a appearing in FIGURE 2 do not appear in FIGURE 9, although the operation of the system of FIGURE 9 would be adaptable to their appearing and being used in the same way they are used in FIGURE 2. Thus it can be seen, that if the valve 92c were to be opened and left open, thereby lowering the pressure in the tank 54c to atmospheric pressure and in accordance reservoir 50c would also be empty. In such an event the system of FIGURE 9, would continue to cycle and raise liquid from the source of the liquid supply, because the pressure in the tank 9c, in accordance with the pressure produced in the conduit 48c by the pumping action of pump 44c, would be available to purge the air from tank 38c, and said pressure would also be available to close the contacts of the switch 74c.

As valves 3c, 5c, 40c, 46c, 46d and 62c are designed to open as liquid is moved therethrough, it should be noted that said valves close as liquid ceases to move therethrough.

Although I have herein set forth and described my invention with respect to certain specific principles and details thereof, it will be understood by those skilled in the art that these may be varied without departing from the spirit and scope of the invention as set forth in the hereunto appended claims.

I claim as my invention:

1. A fluid removal system comprising a first conduit leading upwardly from a source of fluid supply, a first enclosure in communication with said first conduit, a second enclosure vented to atmosphere at the top thereof, a second conduit leading from said first enclosure to said second enclosure, a first pump in said second conduit, a third conduit leading from said second enclosure to said first conduit, said first conduit and said third conduit defining venturi jet means at a level below said enclosures, a third enclosure, a fourth conduit leading from said second enclosure to said third enclosure, a second pump in said fourth conduit, a fifth conduit leading from said third enclosure to said first enclosure, valve means closing said fifth conduit when the pressure in said first enclosure is below atmospheric pressure and opening said fifth conduit when the pressure in said first enclosure is relatively higher than the pressure said valves closes at said first enclosure having vent means therein to vent gases from the first enclosure in response to pressurized liquid introduced from said third enclosure, means thereafter closing the valve means and energizing said first pump after venting of said first enclosure, valve means in said first conduit above said venturi means permitting flow toward said first enclosure and preventing flow from said first enclosure, valve means in said first-named conduit below said venturi means controlling back-flow through said first-named conduit, valve means in said second conduit between said first enclosure and said first pump permitting flow from said first enclosure toward said first pump and biased toward closing sufficiently to afford said venting of gases through said vent means and valve means in said fourth conduit between said second pump and said third enclosure preventing back-flow from said third enclosure, and outlet means for said third enclosure.

2. A fluid removal system comprising a first conduit leading upwardly from a source of fluid supply, a first enclosure in communication with said first conduit, a second enclosure, vented to atmosphere at the top thereof, a second conduit leading from said first enclosure to said second enclosure, a first pump in the second conduit, a third conduit leading from said second enclosure to said first conduit, said first conduit and said third conduit defining venturi jet means at a level below said enclosures, a third enclosure, a fourth conduit leading from the second enclosure to the third enclosure, a second pump in said conduit leading from said second enclosure to said third enclosure, a fifth conduit leading from said third enclosure to said first enclosure, valve means closing said fifth conduit when the pressure in the first enclosure is below atmospheric pressure and opening said fifth conduit when the pressure in said first enclosure is relatively higher than the pressure said valve closes at, said first enclosure having vent means therein to vent gases from the first enclosure in response to pressurized liquid introduced from said third enclosure and means thereafter closing the valve means and energizing said first pump after venting of said first enclosure, means in said second enclosure and said third enclosure operating said second pump when pressure in the third enclosure is relatively low and the liquid level in said second enclosure is somewhat above empty, valve means in said first conduit above said venturi means permitting flow toward said first enclosure and preventing flow from said first enclosure, valve means in said first-named conduit below said venturi means controlling back-flow through said first-named conduit, valve means in said second conduit between said first enclosure and said first pump permitting flow from said first enclosure toward said first pump and biased toward closing sufficiently to afford said venting of gases through said vent means and valve means in said fourth conduit between said second pump and said third enclosure preventing back-flow from said third enclosure, and outlet means for said third enclosure.

3. A fluid removal system comprising a first conduit leading upwardly from a source of fluid supply, a first enclosure in communication with said first conduit, a second enclosure vented to atmosphere at the top thereof, a second conduit leading from said first enclosure to said second enclosure, a first pump in the second conduit, a third conduit leading from said second enclosure to said first conduit, said first conduit and said third conduit defining venturi jet means at a level below said enclosures, a third enclosure, a fourth conduit leading from the second enclosure to the third enclosure, a second pump in said conduit leading from said second enclosure to said third enclosure, a fifth conduit leading from said third enclosure to said first enclosure, valve means closing said fifth conduit when the pressure in the first enclosure is below atmospheric pressure and opening said fifth conduit when the pressure in said first enclosure is relatively higher than the pressure said valve closes at, said first enclosure having vent means therein to vent gases from the first enclosure in response to pressurized liquid introduced from said third enclosure and means thereafter closing the valve means and energizing said first pump after venting of said first enclosure, means in said second enclosure and said third enclosure operating said second pump when pressure in the third enclosure is relatively low and the liquid level in said second enclosure is somewhat above empty, means in the second enclosure terminating the operation of said first pump when the second enclosure is at a relatively high level, valve means in said first conduit above said venturi means permitting flow toward said first enclosure and preventing flow from said first enclosure, valve means in said first-named conduit below said venturi means controlling back-flow through said first-named conduit, valve means in said second conduit between said first enclosure and said first pump permitting flow from said first enclosure toward said first pump and biased toward closing sufficiently to afford said venting of gases through said vent means and valve means in said fourth conduit between said second pump and said third enclosure preventing back-flow from said third enclosure, and means rendering said venting means inoperative when the fluid in said second enclosure is at a relatively high level, and outlet means for said third enclosure.

4. A fluid removal system comprising a first conduit leading upwardly from a source of fluid supply, a first enclosure in communication with said first conduit, a second enclosure vented to atmosphere at the top thereof, a second conduit leading from said first enclosure to said second enclosure, a first pump in the second conduit, a third conduit leading from said second enclosure to said first conduit, said first conduit and said third conduit defining venturi jet means at a level below said enclosures, a third enclosure, a fourth conduit leading from the second enclosure to the third enclosure, a second pump in said conduit leading from said second enclosure to said third enclosure, a fifth conduit leading from said third enclosure to said first enclosure, valve and control means closing said fifth conduit when the pressure in the first enclosure is below atmospheric pressure and opening said fifth conduit when the pressure in said first enclosure is relatively higher than the pressure said valve closes at, said first enclosure having vent means therein to vent gases from the first enclosure in response to pressurized liquid introduced from said third enclosure and means thereafter closing the valve means and energizing said first pump after venting of said first enclosure, means in said second enclosure and said third enclosure operating said second pump when pressure in the third enclosure is relatively low and the liquid level in said second enclosure is somewhat above empty, means in the second enclosure preventing operation of said first pump when the second enclosure is at a relatively high level, including means closing said valve in said fifth conduit when the level in the second enclosure is relatively high, switch means in said second conduit subsequent to said first pump for terminating the operation of said first pump in response to a lack of fluid flow therethrough, valve means in said first conduit above said venturi means permitting flow toward said first enclosure and preventing flow from said first enclosure, valve means in said first-named conduit below said venturi means controlling back-flow through said first-named conduit, valve means in said second conduit between said first enclosure and said first pump permitting flow from said first enclosure toward said first pump and biased toward closing sufficiently to afford said venting of gases through said vent means and valve means in said fourth conduit between said second pump and said third enclosure preventing back-flow from said third enclosure and outlet means for said third enclosure.

5. A fluid removal system comprising a first conduit leading upwardly from a source of fluid supply, a first enclosure in communication with said first conduit, a second enclosure vented to atmosphere at the top thereof, a second conduit leading from said first enclosure to said second enclosure, a first pump, in the second conduit, a third conduit leading from said second enclosure to said first conduit, said first conduit and said third conduit defining venturi jet means at a level below said enclosures, a third enclosure, a fourth conduit leading from the second enclosure to the third enclosure, a second pump in said conduit leading from said second enclosure to said third enclosure, a fifth conduit leading from said third enclosure to said first enclosure, valve and control means closing said fifth conduit when the pressure in the first enclosure is below atmospheric pressure and opening said fifth conduit when the pressure in said first enclosure is relatively higher than the pressure said valve closes at, said first enclosure having vent means therein to vent gases from the first enclosure in response to pressurized liquid introduced from said third enclosure and means thereafter closing the valve means and energizing said first pump after venting of said first enclosure, means in said second enclosure and said third enclosure operating said second pump when pressure in the third enclosure is relatively low and the liquid level in said second enclosure is somewhat above empty, means in the second enclosure terminating the operation of said first pump when the second enclosure is at a relatively high level, switch means in said second conduit subsequent to said first pump for terminating the operation of said first pump in response to a lack of fluid flow therethrough, valve means in said second conduit preventing back-flow from said second enclosure to said first enclosure and restricting flow from said first enclosure to said second enclosure through said second conduit, and biased toward closing sufficiently to afford said venting of gases through said vent means, valve means in said first conduit above said venturi means permitting flow toward said first enclosure and preventing flow from said first enclosure, valve means in said first-named conduit below said venturi means controlling back-flow through said first-named conduit, and valve means in said fourth conduit between said second pump and said third enclosure preventing back-flow from said third enclosure and outlet means for said third enclosure.

6. A fluid removal system comprising a first conduit leading upwardly from a source of fluid supply, a first enclosure in communication with said conduit, a second enclosure vented to atmosphere at the top thereof, a second conduit leading from said first enclosure to said second enclosure, a first pump in the second conduit, a third conduit leading from said second enclosure to said first conduit, said first conduit and said third conduit defining venturi jet means at a level below said enclosures, a third enclosure, a fourth conduit leading from the second enclosure to the third enclosure, a second pump in said conduit leading from said second enclosure to said third enclosure, a fifth conduit leading from said third enclosure to said first enclosure, valve and control means closing said fifth conduit when the pressure in the first enclosure is below atmospheric pressure and opening said fifth conduit when the pressure in said first enclosure is relatively higher than the pressure said valve closes at, said first enclosure having vent means therein to vent gases from the first enclosure in response to pressurized liquid introduced from said third enclosure and means thereafter closing the valve means and energizing said first pump after venting of said first enclosure, means in said second enclosure and said third enclosure operating said second pump when pressure in the third enclosure is relatively low and the liquid level in said second enclosure is somewhat above empty, means in the second enclosure terminating the operation of said first pump when the second enclosure is at a relatively high level, switch means in said second conduit subsequent to said first pump for terminating the operation of said first pump in response to a lack of fluid flow therethrough, valve means in said second conduit subsequent to said switch means for restricting the flow through said second conduit, valve means in said third conduit for terminating the operation of said venturi means thereby converting the system from deep well to shallow well operation, valve means in said first conduit above said venturi means permitting flow toward said first enclosure and preventing flow from said first enclosure, valve means in said first-named conduit below said venturi means controlling back-flow through said first-named conduit, valve means in said second conduit between said first enclosure and said first pump permitting flow from said first enclosure toward said first pump and biased toward closing sufficiently to afford said venting of gases through said vent means and valve means in said fourth conduit between said second pump and said third enclosure preventing back-flow from said third enclosure and outlet means for said third enclosure.

7. A fluid removal system comprising a first conduit leading upwardly from a source of fluid supply, a first enclosure in communication with said conduit, a second enclosure vented to atmosphere, a second conduit leading from said first enclosure to said second enclosure, a first pump in the second conduit, a third conduit leading from said second enclosure to said first conduit, said first conduit and said third conduit defining venturi jet means at a level below said enclosures, a third enclosure, a fourth conduit leading from the second enclosure to the third enclosure, a second pump in said conduit leading from said second enclosure to said third enclosure, a fifth conduit leading from said third enclosure to said first enclosure, valve means closing said fifth conduit when the pressure in the first enclosure is below atmospheric pressure and opening said fifth conduit when the pressure in said first enclosure is relatively higher than the pressure said valve closes at, said first enclosure having vent means therein to vent gases from the first enclosure in response to pressurized liquid introduced from said third enclosure and means thereafter closing the valve means and energizing said first pump after venting of said first enclosure, means in said second enclosure and said third enclosure operating said second pump when pressure in the third enclosure is relatively low and the liquid level in said second enclosure is somewhat above empty, means in the second enclosure terminating the operation of said second pump when the second enclosure is at a relatively low level, means in the third enclosure terminating the operation of said second pump when pressure in the third enclosure is relatively high, switch means in said second conduit subsequent to said first pump for terminating the operation of said first pump in response to a lack of fluid flow therethrough, valve means in said second conduit subsequent to said switch means for restricting the flow through the said conduit; valve means in said third conduit controlling flow from said second enclosure to said venturi, outlet means for said third enclosure, a sixth conduit extending from said third conduit subsequent to said valve therein to said outlet means, said outlet having a valve therein, said sixth conduit having a valve therein controlling flow from said third enclosure to said venturi, a valve means in said first conduit above said venturi means permitting flow toward said first enclosure and preventing flow from said first enclosure, valve means in said first-named conduit below said venturi means controlling back-flow through said first-named conduit, valve means in said second conduit between said first enclosure and said first pump permitting flow from said first enclosure toward said first pump and biased toward closing sufficiently to afford said venting of gases through said vent means and valve means in said fourth conduit between said second pump and said third enclosure preventing back-flow from said third enclosure, and means in said second enclosure closing valve in said fifth conduit and terminating operation of said first pump.

8. A fluid removal system comprising a first conduit leading upwardly from a source of fluid supply, a first enclosure in communication with said conduit, a second enclosure vented to atmosphere, a second conduit leading from said first enclosure to said second enclosure, a first pump in the second conduit, a third conduit leading from said second enclosure to said first conduit, said first conduit and said third conduit defining venturi jet means at a level below said enclosures, a third enclosure, a fourth conduit leading from the second enclosure to the third enclosure, a second pump in said conduit leading from said second enclosure to said third enclosure, a fifth conduit leading from said third enclosure to said first enclosure, valve and control means closing said fifth conduit when the pressure in the first enclosure is below atmospheric pressure and opening said fifth conduit when the pressure in said first enclosure is relatively higher than the pressure said valve closes at, said first enclosure having vent means therein to vent gases from the first enclosure in response to pressurized liquid introduced from said third enclosure and means thereafter closing the valve means and energizing said first pump after venting of said first enclosure, means in said second enclosure and said third enclosure operating said second pump when pressure in the third enclosure is relatively low and the liquid level in said second enclosure is somewhat above empty, means in the second enclosure terminating the operation of said first pump when the second enclosure is at a relatively high level, switch means in said second conduit subsesquent to said first pump for terminating the operation of said first pump in response to a lack of fluid flow therethrough, valve means in said second conduit subsequent to said switch means for restricting the flow through the said conduit, valve means in said third conduit for terminating the operation of said venturi means thereby converting the system from deep well to shallow well operation, valve means in said first conduit above said venturi means permitting flow toward said first enclosure and preventing flow from said first enclosure, valve means in said first conduit below said venturi means controlling back-flow through said first conduit, valve means in said second conduit between said first enclosure and said first pump permitting flow from said first enclosure toward said first pump and biased toward closing sufficiently to afford said venting of gases through said vent means and valve means in said fourth conduit between said second pump and said third enclosure preventing back-flow from said third enclosure, outlet means for said third enclosure, a sixth conduit leading from said third conduit subsequent to said valve therein to said outlet means, said outlet means having a valve therein and said sixth conduit having a valve therein, and a seventh conduit connecting with said second conduit at a point prior to the switch therein and with said third conduit and having a valve therein.

9. A fluid removal system comprising a first conduit leading upwardly from a source of fluid supply, a first enclosure in communication with said first conduit, a second enclosure vented to atmosphere, a second conduit leading from said first enclosure to said second enclosure, a first pump in said second conduit, a third conduit leading from said second enclosure to said first conduit, said first conduit and said third conduit defining venturi jet means at a level below said enclosures, a third enclosure, a fourth conduit leading from the second enclosure to the third enclosure, a second pump in said conduit leading from said second enclosure to said third enclosure, a fifth conduit leading from said third enclosure to said first enclosure, valve and control means closing said fifth conduit when the pressure in the first enclosure is below atmospheric pressure and opening said fifth conduit when the pressure in said first enclosure is relatively higher than the pressure said valve closes at, said first enclosure having vent means therein to vent gases from the first enclosure in response to pressurized liquid introduced from said third enclosure and means thereafter closing the valve means and energizing said first pump after venting of said first enclosure, means in said second enclosure and said third enclosure operating said second pump when pressure in the third enclosure is relatively low and the liquid level in said second enclosure is somewhat above empty, and terminating operation of said second pump when the pressure in the third enclosure is relatively high or said second enclosure is substantially empty, means in the second enclosure operating said first pump when the second enclosure is less than full, and terminating the operation of said first pump when the second enclosure is at a relatively high level, switch means in said second conduit subsequent to said first pump for terminating the operation of said first pump in response to a lack of fluid flow therethrough, valve means in said second conduit subsequent to said switch means for restricting the flow through the said second conduit, valve means in said third conduit, outlet means for said third enclosure, said outlet having a valve therein, a sixth conduit extending from said third conduit subsequent to said valve therein to said third enclosure, said sixth conduit having a valve therein, a seventh conduit communicating between said second conduit and said third conduit and having a valve therein, an eighth conduit leading from said first enclosure to said third conduit having a third pump therein, a valve between the first enclosure and said third pump, said eighth conduit joining said third conduit above said venturi, valve means in said first conduit above said venturi jet permitting flow toward said first enclosure and preventing flow from said first enclosure, valve means in said first conduit below said venturi means controlling back-flow through said first conduit, valve means in said second conduit between said first enclosure and said first pump permitting flow from said first enclosure toward said first pump and biased toward closing sufficiently to afford said venting of gases through said vent means and valve means in said fourth conduit between said second pump and said third enclosure preventing back-flow from said third enclosure.

10. A fluid removal system comprising a first conduit leading upwardly from a source of fluid supply, a first enclosure in communication with said first conduit, a second enclosure, a second conduit leading from said first enclosure to said second enclosure, a first pump in said second conduit, a third conduit leading from said second enclosure to said first conduit, said first conduit and said third conduit defining venturi jet means at a level below said enclosures, a third enclosure, a fourth conduit leading from said second enclosure to said third enclosure, a second pump in said fourth conduit, a fifth conduit leading from said third enclosure to said first enclosure, valve means closing said fifth conduit when the pressure in said first enclosure is below atmospheric pressure and opening said fifth conduit when the pressure in said first enclosure is relatively higher than the pressure said valve closes at, said first enclosure having vent means therein to vent gases from the first enclosure in response to pressurized liquid introduced from said third enclosure, means thereafter closing the valve means and energizing said first pump after venting of said first enclosure, valve means in said first conduit above said venturi means permitting flow toward said first enclosure and preventing flow from said first enclosure, valve means in said first conduit below said venturi means controlling back-flow through said first conduit, valve means in said second conduit between said first pump and said second enclosure permitting flow from said first enclosure toward said second enclosure and biased toward closing sufficiently to afford said venting of gases through said vent means and valve means in said fourth conduit between said second pump and said third enclosure preventing back-flow from said third enclosure.

11. A fluid removal system comprising a conduit leading upwardly from a source of fluid supply, a closed first tank filled to its maximum capacity with liquid at the upper end of said conduit in communication therewith, a conduit leading from said tank, a pump in said conduit leading from said tank, a second tank vented to atmosphere at the top thereof, a conduit leading from said first pump to said second tank and a conduit leading from said second tank, said first-named conduit having venturi means therein below the tank and the last-named conduit having a nozzle cooperating with the venturi means to provide a venturi jet therewith, switch means in said conduit leading to said second tank disposed subsequent to said pump and prior to said second tank for shutting off said pump therein when fluid therethrough ceases and valve means in said first-named conduit below said venturi means controlling back-flow through said first-named conduit.

12. A fluid removal system comprising a first conduit leading upwardly from a source of fluid supply, a closed first enclosure filled to its maximum capacity with liquid at the upper end of said first conduit in communication therewith, a second enclosure, a second conduit leading from said first enclosure to said second enclosure, a pump in said second conduit, a third conduit leading from said second enclosure to said first conduit, venturi means in said first conduit formed in cooperation with said third conduit below said enclosures, and vent means in said second enclosure.

13. A fluid removal system comprising a first conduit leading upwardly from a source of fluid supply, a closed first enclosure filled to its maximum capacity with liquid at the upper end of said first conduit in communication therewith, a second enclosure, a second conduit leading from said first enclosure to said second enclosure, a pump in said second conduit, a third conduit leading from said second enclosure to said first conduit, venturi means in said first conduit formed in cooperation with said third conduit below said enclosures, vent means in said second enclosure, a third enclosure, a fourth conduit leading from said second enclosure to said third enclosure, a pump in said fourth conduit, a fifth outlet conduit leading from said third enclosure and valve means in said fifth conduit controlling the flow of fluid from said third enclosure.

References Cited in the file of this patent

UNITED STATES PATENTS

| | | |
|---|---|---|
| 501,954 | Moore | July 25, 1893 |
| 1,038,201 | Rateau | Sept. 12, 1912 |
| 1,418,921 | Habdley | June 6, 1922 |
| 1,758,376 | Sawyer | May 13, 1930 |
| 1,868,621 | Wolff et al. | July 26, 1932 |
| 2,061,013 | Wade | Nov. 17, 1936 |
| 2,080,624 | McMahon | May 18, 1937 |
| 2,183,351 | Harris | Dec. 12, 1939 |
| 2,292,796 | Pyle | Aug. 11, 1942 |
| 2,400,651 | Marsh | May 21, 1946 |
| 2,460,197 | Smith | Jan. 25, 1949 |
| 2,466,792 | Conery | Apr. 12, 1949 |
| 2,486,288 | Jacuzzi | Oct. 25, 1949 |
| 2,533,028 | McConaghy | Dec. 5, 1950 |
| 2,603,157 | Conery | July 15, 1952 |
| 2,651,259 | Brush | Sept. 8, 1953 |
| 2,654,434 | Culleton | Oct. 6, 1953 |
| 2,674,189 | Lung | Apr. 6, 1954 |
| 2,694,365 | Armstrong et al. | Nov. 16, 1954 |
| 2,953,659 | Edwards | Sept. 20, 1960 |
| 2,981,195 | Payne | Apr. 25, 1961 |
| 2,990,780 | Kreuter | July 4, 1961 |

FOREIGN PATENTS

| | | |
|---|---|---|
| 105,017 | Germany | June 30, 1899 |
| 726,496 | Germany | Oct. 14, 1942 |
| 382,592 | Great Britain | Oct. 27, 1932 |
| 631,521 | Great Britain | Nov. 4, 1949 |